US009300483B2

(12) United States Patent
Banavalikar et al.

(10) Patent No.: US 9,300,483 B2
(45) Date of Patent: Mar. 29, 2016

(54) SELF-ROUTING MULTICAST IN A SOFTWARE DEFINED NETWORK FABRIC

(71) Applicant: International Business Machines Corporation, Armonk, NY (US)

(72) Inventors: Bhalachandra G. Banavalikar, Cupertino, CA (US); Casimer M. DeCusatis, Poughkeepsie, NY (US); Mircea Gusat, Langnau (CH); Keshav G. Kamble, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 13/843,905

(22) Filed: Mar. 15, 2013

(65) Prior Publication Data
US 2014/0269415 A1 Sep. 18, 2014

(51) Int. Cl.
*H04L 12/66* (2006.01)
*H04L 12/56* (2006.01)
*H04L 12/18* (2006.01)

(52) U.S. Cl.
CPC .................. *H04L 12/185* (2013.01)

(58) Field of Classification Search
CPC .................................... H04L 12/185
USPC ......................................... 370/254
See application file for complete search history.

(56) References Cited

U.S. PATENT DOCUMENTS

| | | | |
|---|---|---|---|
| 7,496,096 B1 | 2/2009 | Dong et al. | |
| 8,462,794 B2* | 6/2013 | Dobbins et al. | 370/395.53 |
| 8,488,603 B2 | 7/2013 | Zha et al. | |
| 8,953,619 B2* | 2/2015 | Basso et al. | 370/400 |
| 2001/0007557 A1 | 7/2001 | Yamada et al. | |
| 2003/0076803 A1* | 4/2003 | Chuah | 370/338 |
| 2003/0091165 A1* | 5/2003 | Bearden et al. | 379/88.08 |
| 2003/0202513 A1* | 10/2003 | Chen et al. | 370/390 |
| 2004/0246984 A1* | 12/2004 | Hundscheidt et al. | 370/432 |
| 2005/0195817 A1* | 9/2005 | Chen et al. | 370/390 |
| 2008/0232368 A1* | 9/2008 | Ikegami et al. | 370/390 |
| 2009/0103466 A1 | 4/2009 | Gu et al. | |
| 2010/0142530 A1 | 6/2010 | Zha et al. | |

(Continued)

FOREIGN PATENT DOCUMENTS

CN 101369907 A 2/2009

OTHER PUBLICATIONS

Boivie et al. "Explicit Multicast (Xcast) Concepts and Options," IETF RFC 5058, Nov. 2007, https://tools.ietf.org/html/rfc5058, pp. 1-35.

(Continued)

*Primary Examiner* — Gerald Smarth
(74) *Attorney, Agent, or Firm* — Zilka-Kotab, PC

(57) ABSTRACT

Methods, systems, and computer program products presented herein provide for self-routing multicast. In one embodiment, a system includes a switch controller including a hardware processor and logic integrated with and/or executable by the processor, the logic being adapted to receive a multicast data stream join request from a source device in a network, create a multipath identifier (ID) for the multipath data stream, create a series of path identifiers (IDs) for each intermediate switch in the network based on a local network topology database, each path ID being associated with a desired output port bitmap, and transmit the multipath ID and a path ID to a source of the multicast data stream, the path ID corresponding to the source of the multicast data stream join request.

20 Claims, 10 Drawing Sheets

(56) References Cited

U.S. PATENT DOCUMENTS

2011/0228770 A1* 9/2011 Dholakia et al. .............. 370/390
2013/0003732 A1* 1/2013 Dholakia et al. .............. 370/390
2015/0131660 A1* 5/2015 Shepherd et al. ............. 370/390

OTHER PUBLICATIONS

International Search Report and Written Opinion from PCT Application No. PCT/CN2014/073032, dated Jun. 11, 2014.

* cited by examiner

SELF-ROUTING MULTICAST IN A SOFTWARE DEFINED NETWORK FABRIC

BACKGROUND

The present invention relates to data center management and file systems, and more specifically, this invention relates to using credit-based flow control for unicast, multicast, and broadcast packets in lossless Ethernet networks.

Currently available lossless Ethernet networks do not allow for credit-based flow control where how traffic flows are prioritized and handled is determined based on an available amount of credit. Instead, conventional lossless Ethernet networks, and more specifically the switches used therein, when an issue or problem arises and a packet is undeliverable, simply discard the packet, and in some instances, retransmit the discarded packets at a later time. This approach adds additional latency to the network when a packet is undeliverable, and may result in some packets being dropped permanently, even in the lossless Ethernet network.

Ethernet is becoming more and more popular and some conventional switched fabric networks may make use of credit-based flow control, such as InfiniBand and other network protocols. However, these credit-based flow control systems are not applicable nor are they capable of being used in Ethernet networks or to utilize existing Ethernet frame formats and protocols. In addition, conventional Ethernet networks require separate multicast routing tables, groups, and addresses to perform packet multicast and/or broadcast functions. This limits their scalability and makes it difficult to extend conventional Ethernet network design to applications where credit-based flow control is used.

BRIEF SUMMARY

In one embodiment, a system includes a switch controller including a hardware processor and logic integrated with and/or executable by the processor, the logic being adapted to receive a multicast data stream join request from a source device in a network, create a multipath identifier (ID) for the multipath data stream, create a series of path identifiers (IDs) for each intermediate switch in the network based on a local network topology database, each path ID being associated with a desired output port bitmap, and transmit the multipath ID and a path ID to a source of the multicast data stream, the path ID corresponding to the source of the multicast join request.

In another embodiment, a computer program product for providing self-routing multicast includes a computer readable storage medium having program code embodied therewith, the program code readable/executable by a processor to receive, using the processor, a multicast data stream join request from a source device in a network, create, using the processor, a multipath ID for the multipath data stream, create, using the processor, a series of path IDs for each intermediate switch in the network based on a local network topology database, each path ID being associated with a desired output port bitmap, and transmit, using the processor, the multipath ID and a path ID to a source of the multicast data stream, the path ID corresponding to the source of the multicast join request.

In yet another embodiment, a method for providing self-routing multicast includes receiving, using a switch controller, a multicast data stream join request from a source device in a network, creating a multipath ID for the multipath data stream, creating a series of path IDs for each intermediate switch in the network based on a local network topology database, each path ID being associated with a desired output port bitmap, and transmitting the multipath ID and a path ID to a source of the multicast data stream, the path ID corresponding to the source of the multicast join request.

Other aspects and embodiments of the present invention will become apparent from the following detailed description, which, when taken in conjunction with the drawings, illustrate by way of example the principles of the invention.

DETAILED DESCRIPTION

Figure 1:
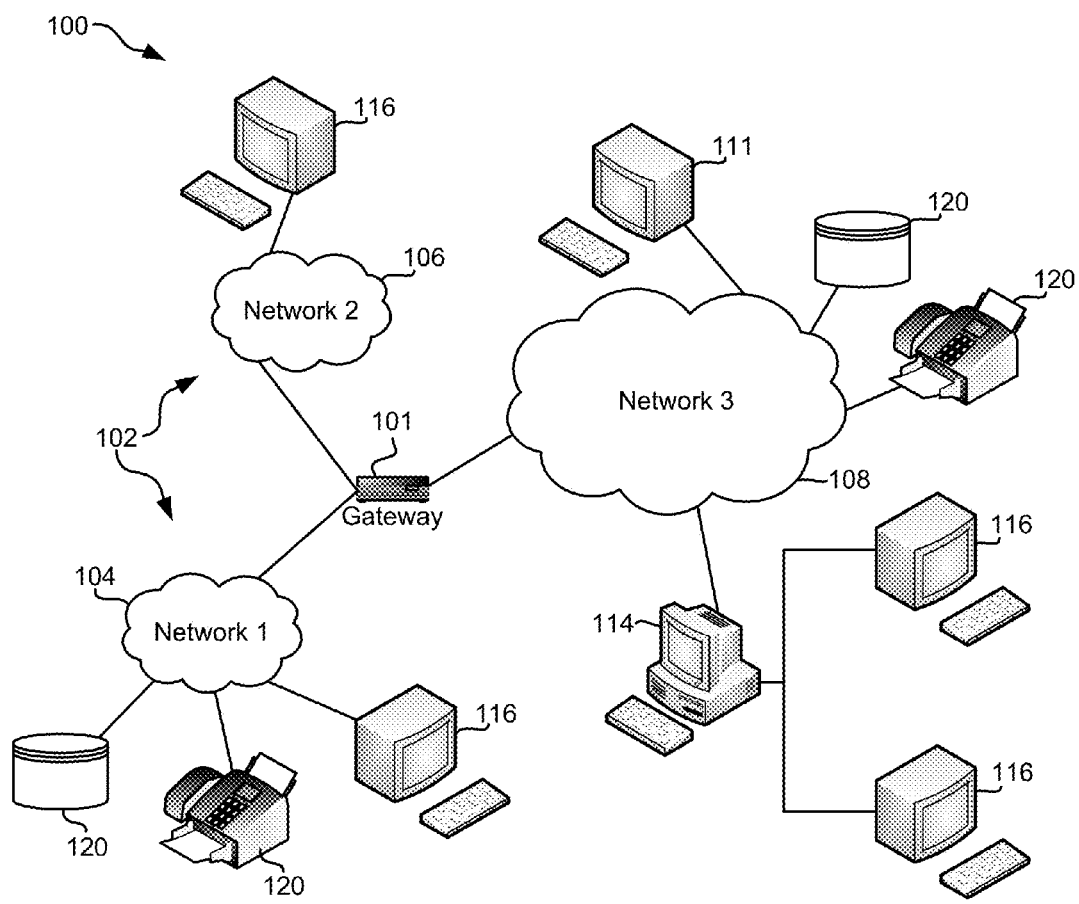
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for implementing broadcast and multicast (herein referred to as simply "multicast") credit-based flow control in lossless Ethernet networks. Particularly, a credit-based flow control mechanism allows for multicast packets to be sent out without the use of separate multicast routing tables in the switches of the network fabric. Instead, multicast packets are identified by a switch controller, which also provides switch specific routing identifiers for multicast groups. The credit-based flow control may be implemented in a software defined network (SDN) environment enabled by the switch controller, in various approaches.

In one general embodiment, a system includes a switch controller including a hardware processor and logic integrated with and/or executable by the processor, the logic being adapted to receive a multicast data stream join request from a source device in a network, create a multipath identifier (ID) for the multipath data stream, create a series of path identifiers (IDs) for each intermediate switch in the network based on a local network topology database, each path ID being associated with a desired output port bitmap, and transmit the multipath ID and a path ID to a source of the multicast data stream, the path ID corresponding to the source of the multicast join request.

In another general embodiment, a computer program product for providing self-routing multicast includes a computer readable storage medium having program code embodied therewith, the program code readable/executable by a processor to receive, using the processor, a multicast data stream join request from a source device in a network, create, using the processor, a multipath ID for the multipath data stream, create, using the processor, a series of path IDs for each intermediate switch in the network based on a local network topology database, each path ID being associated with a desired output port bitmap, and transmit, using the processor, the multipath ID and a path ID to a source of the multicast data stream, the path ID corresponding to the source of the multicast join request.

In yet another general embodiment, a method for providing self-routing multicast includes receiving, using a switch controller, a multicast data stream join request from a source device in a network, creating a multipath ID for the multipath data stream, creating a series of path IDs for each intermediate switch in the network based on a local network topology database, each path ID being associated with a desired output port bitmap, and transmitting the multipath ID and a path ID to a source of the multicast data stream, the path ID corresponding to the source of the multicast join request.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
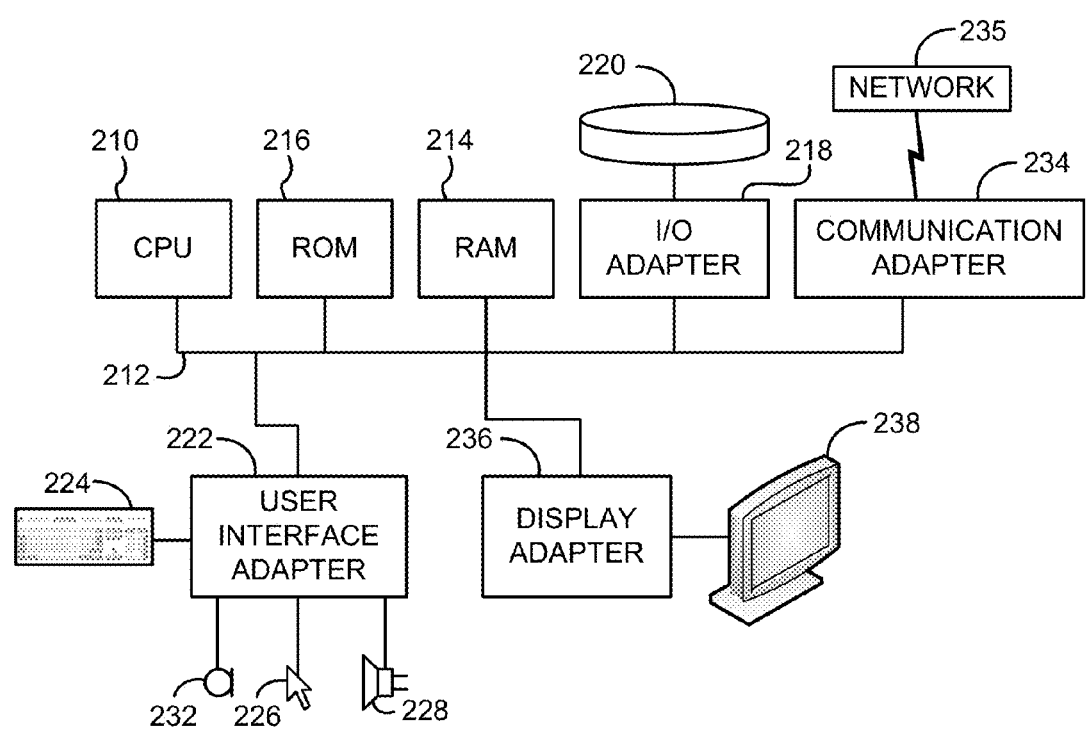
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
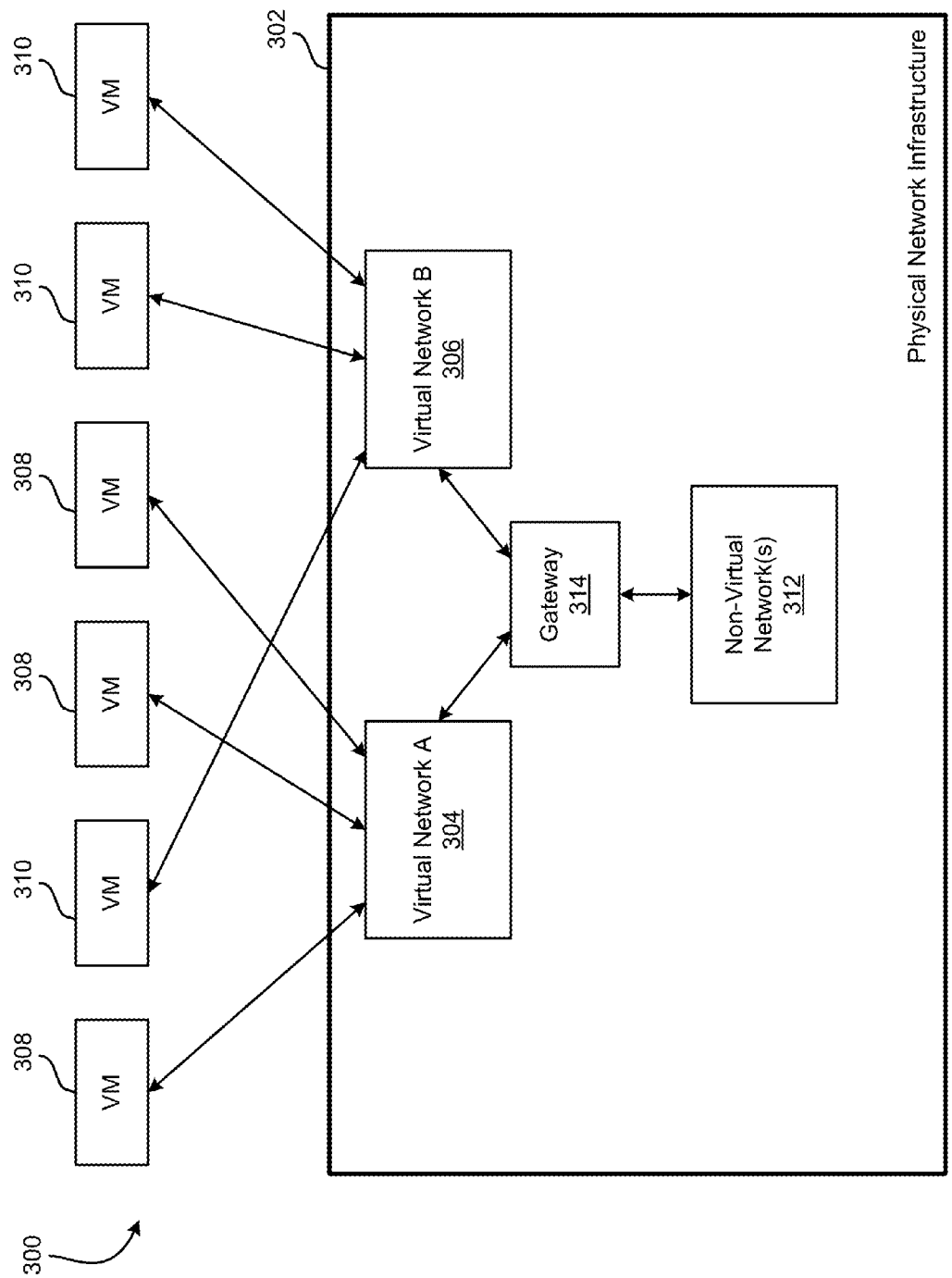
FIG. 3 is a simplified diagram of a virtualized data center, according to one embodiment.

Referring now to FIG. 3, a conceptual view of an overlay network 300 is shown according to one embodiment. The overlay network may utilize any overlay technology, standard, or protocol, such as a Virtual eXtensible Local Area Network (VXLAN), Distributed Overlay Virtual Ethernet (DOVE), Network Virtualization using Generic Routing Encapsulation (NVGRE), etc.

In order to virtualize network services, other than simply providing a fabric communication path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if it the architecture is similar to a large flat switch, in a very large Layer-2 (L2) domain, then the VMs are aided in their attempt to move data across the architecture.

Figure 4:
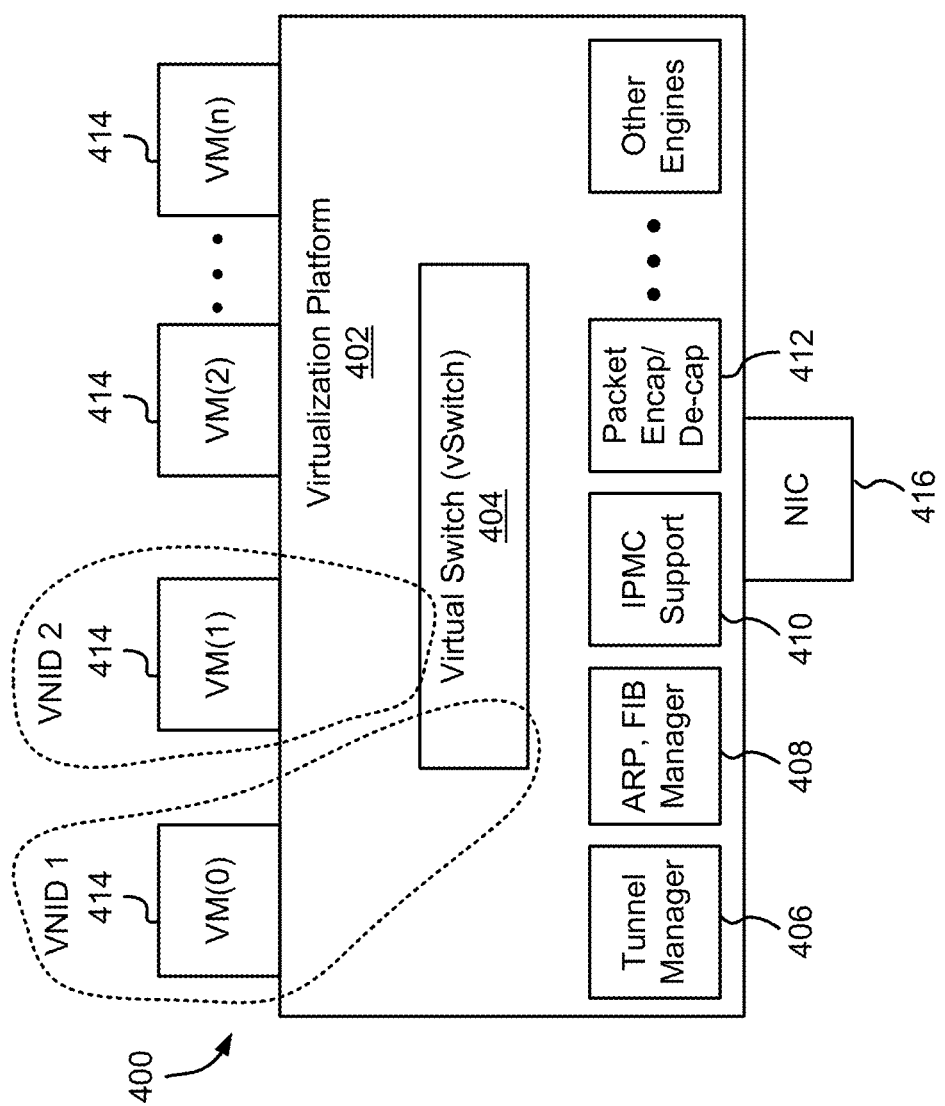
FIG. 4 shows a server, according to one embodiment.

With reference to FIG. 4, a server 400 is shown according to one embodiment. As shown, the server 400 includes a virtualization platform 402 which provides and manages a vSwitch 404.

According to one embodiment, overlay functionality may be provided to the server 400. In order to accomplish this, the virtualization platform 402 may interact with a plurality of discrete software engines, such as a tunnel manager 406, an ARP and forwarding information base (FIB) manager 408, an engine for providing internet protocol multicast (IPMC) support 410, a packet encapsulation and de-capsulation engine 412, and any other overlay-enhancing software engines as known in the art. In another embodiment, these modules or software engines may be enacted on a network interface card (NIC) 416, or an overlay gateway connected via the NIC 416 to the server 400.

According to one embodiment, the NIC 416 may be a hardware NIC or a virtual NIC (vNIC) provided by the server 400, or a combination of a hardware NIC and a vNIC, as would be understood by one of skill in the art. The server 400 may provide the vNIC via a processor, the virtualization platform 402, or any other module or aspect of the server 400.

The virtualization platform 402 also provides support for any number of VMs 414, shown in FIG. 4 as VM(0), VM(1), VM(2), . . . , VM(n). The VMs 414 may be arranged in one or more virtual networks (each virtual network may have a different virtual network identifier (VNID), such as VNID 1, VNID 2, VNID 3, etc. The number and arrangement of the VMs 414 in the exemplary virtual networks is not meant to be limiting on what configurations are possible, as the Figures only show exemplary arrangements of VMs 414 and virtual networks.

Figure 5:
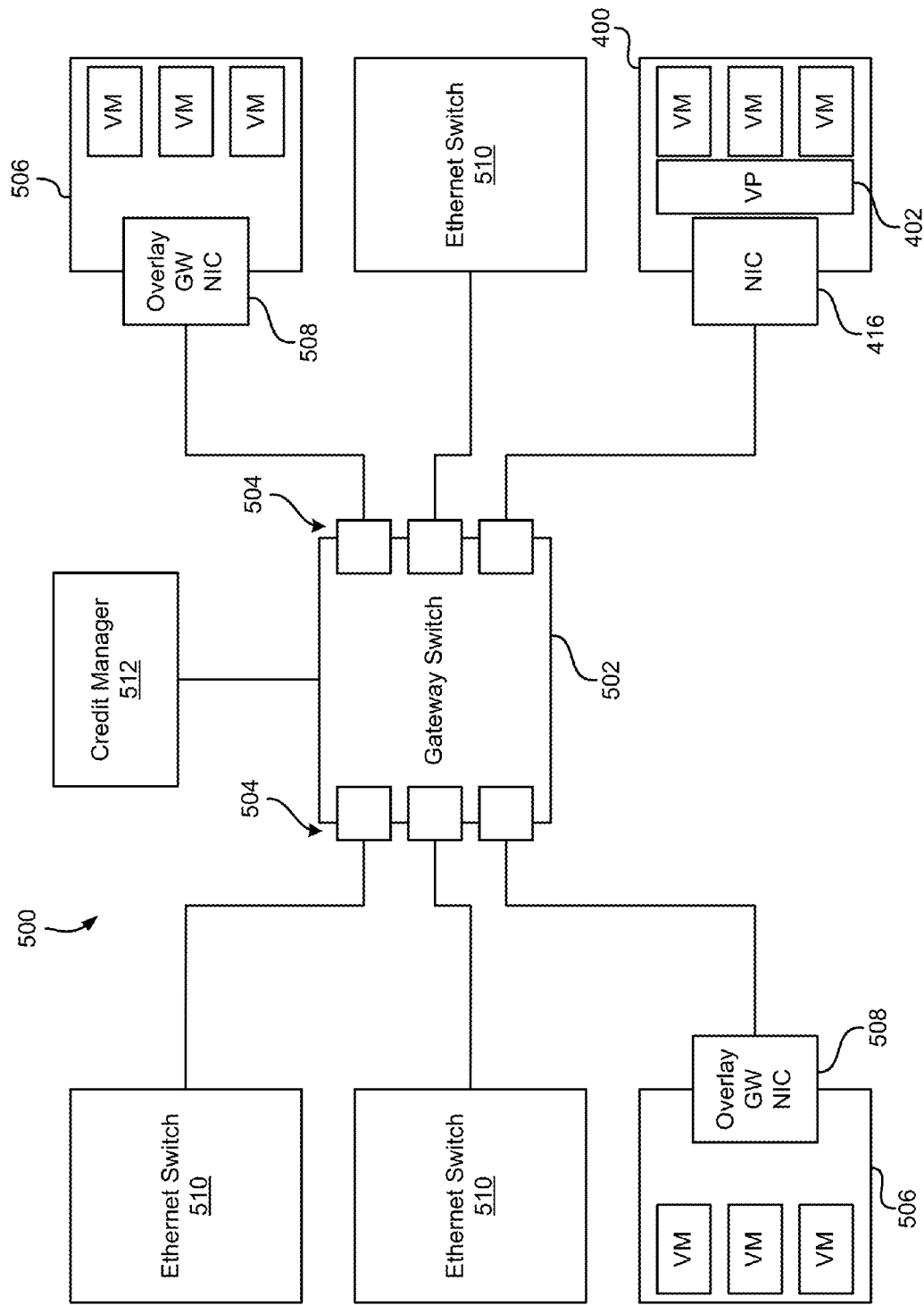
FIG. 5 shows a network, according to one embodiment.

In FIG. 5, a network 500 is shown according to one embodiment. As shown, servers 400 having contemporary NICs 416 and servers 506 having overlay gateway (GW) NICs 508 may be used in the same network 500. One or more Ethernet switches 510 may be included in the network 500, and a gateway switch 502 may be provided which is interconnected and/or accessible to all devices, switches 510, virtual switches, and any other devices in the network 500, according to one embodiment. The gateway switch 502 may be used to interconnect the servers 400, 506 and Ethernet switches 510 or the servers 400, 506 and Ethernet switches 510 may be connected directly to one another. The gateway switch 502 may operate according to OpenFlow and/or other SDN standards, i.e., the gateway switch 502 may be adapted to communicate with a switch controller (described in more detail in FIG. 7).

Referring again to FIG. 5, each Ethernet switch 510 and the gateway switch 502 include a plurality of ports 504 for connecting thereto and transmitting and/or receiving packets, such as data packets, control packets, etc. The contemporary NICs 416 may communicate via a virtualization platform (VP) 402 that may provide some overlay functionality, in other embodiments. Furthermore, the network 500 may include a credit manager 512 adapted to distribute flow credits to all ports in the network 500 according to a priority of each individual port. In another embodiment, the credit manager 512 be implemented by a switch controller which is capable of communicating to any SDN-compliant switches 510, servers 400, 506, and other SDN-compliant devices in the network 500, whether virtual or physical. In addition, the credit manager 512 may be a module or other soft logic which may be implemented by a processor of another device in the network 500, such as a switch controller.

Figure 6:
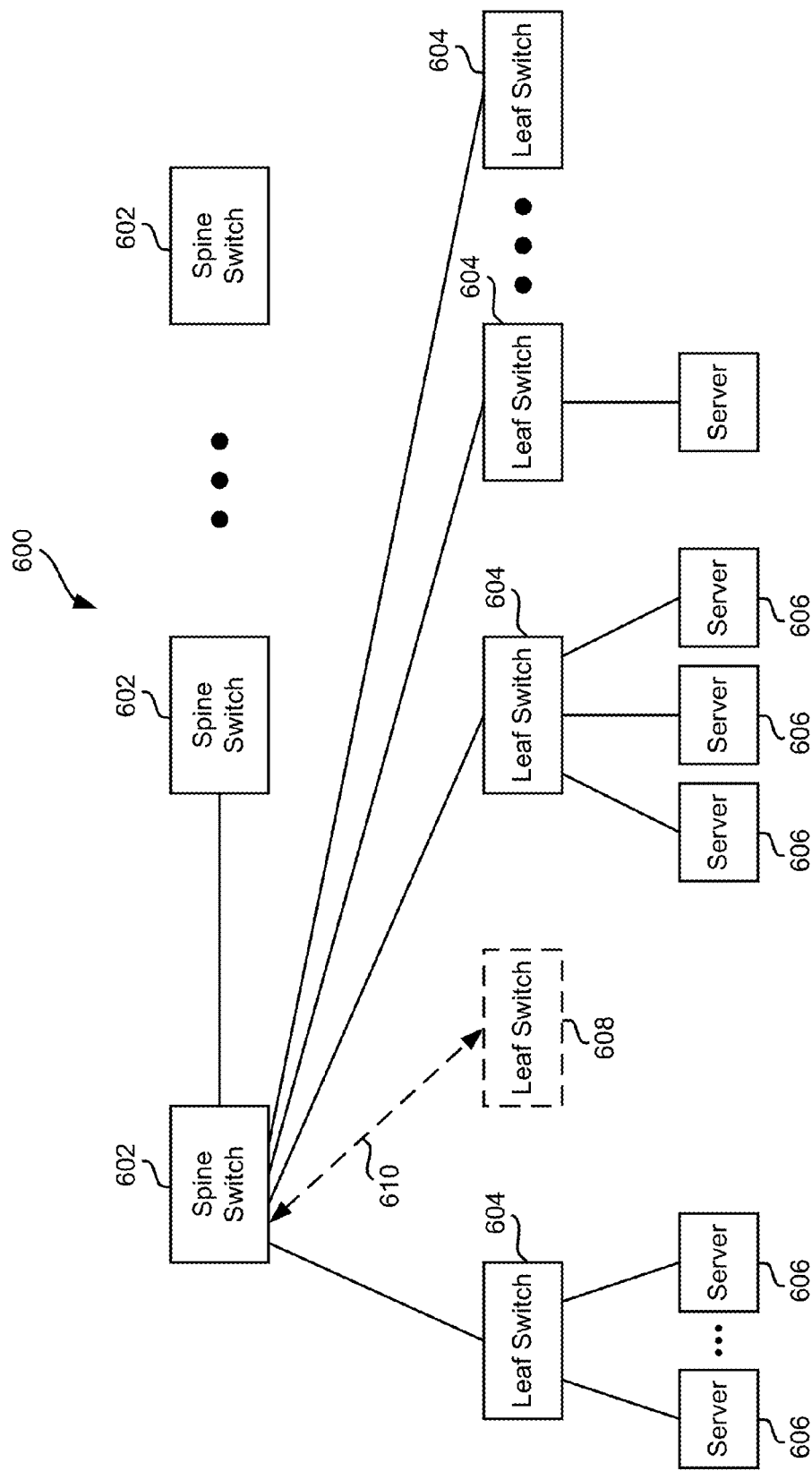
FIG. 6 shows multicast packet handling according to the prior art.

With reference to FIG. 6, multicast packet handling is described according to the prior art. In the network 600 shown in FIG. 6, a plurality of spine switches 602 are interconnected with a plurality of leaf switches 604. Any suitable connections may be used, such as Ethernet and Ethernet-capable cables, such as Cat 5, Cat 5e, Cat 6, etc., wireless connections, or any other suitable connections known in the art. Although each spine switch 602 is connected to every leaf switch 604, and each leaf switch 604 is connected to every spine switch 602, not all of these connections are shown, i.e., some are omitted for clarity. Furthermore, although the spine switches 602 may all be interconnected with one another, some of these connections are also omitted for clarity.

Each of the leaf switches 604 may be connected to one or more servers 606, with each server 606 being capable of hosting one or more VMs (not shown for clarity), as known in the art.

According to the prior art, when a new leaf switch 608 joins the network 600, it sends a multicast join request to a spine switch 602, and the new leaf switch 608 includes a multicast routing table in the join request. This multicast routing table notifies the spine switch 602 of any multicast-related addresses to send multicast packets to through the new leaf switch 608 in subsequent multicast transmissions.

Conventional Ethernet networks, such as network 600, are gradually being transformed into SDNs through the use of centralized switch controllers which abstract the management and control planes for a switch. This approach may be leveraged to create a more efficient form of multicast, which is also better suited to implementations of flow control that would allow other protocols, such as InfiniBand, remote direct memory access (RDMA), etc., to operate over a converged Ethernet fabric.

There is a prior art protocol referred to as explicit multicast (Xcast), a proposed IETF standard, which discusses a method for packets to be routed based on information contained in the packet header. See IEEE proposal on explicit multicast: R. Boivie, N. Feldman, Y. Imai, W. Livens, and D. Ooms, "Explicit Multicast (Xcast) Concepts and Options," IETF RFC 5058. However, this approach has not yet been extended to SDN networks.

Traditional multicast routing protocols require a multicast routing or forwarding table in each of the routers and switches for forwarding multicast packets. In Xcast, each multicast packet carries all destination information in a routing header of the packet, which is optionally added to the packet. Xcast does not use a group address; instead, it uses an explicit list of unicast destination IP addresses that form a stack in the header, and the list is processed in each router and switch along the data path.

Intermediate routers and switches lookup the next hop for each address using a unicast routing table, destinations are bundled up which have the same next hop, and the packet is forwarded to the next hop until the multicast packet has been copied and dispatched to each group member in the list. Accordingly, the use of Xcast may result in the production of a large header, and the method may not scale sufficiently for use in larger, enterprise-sized networks.

Figure 7:
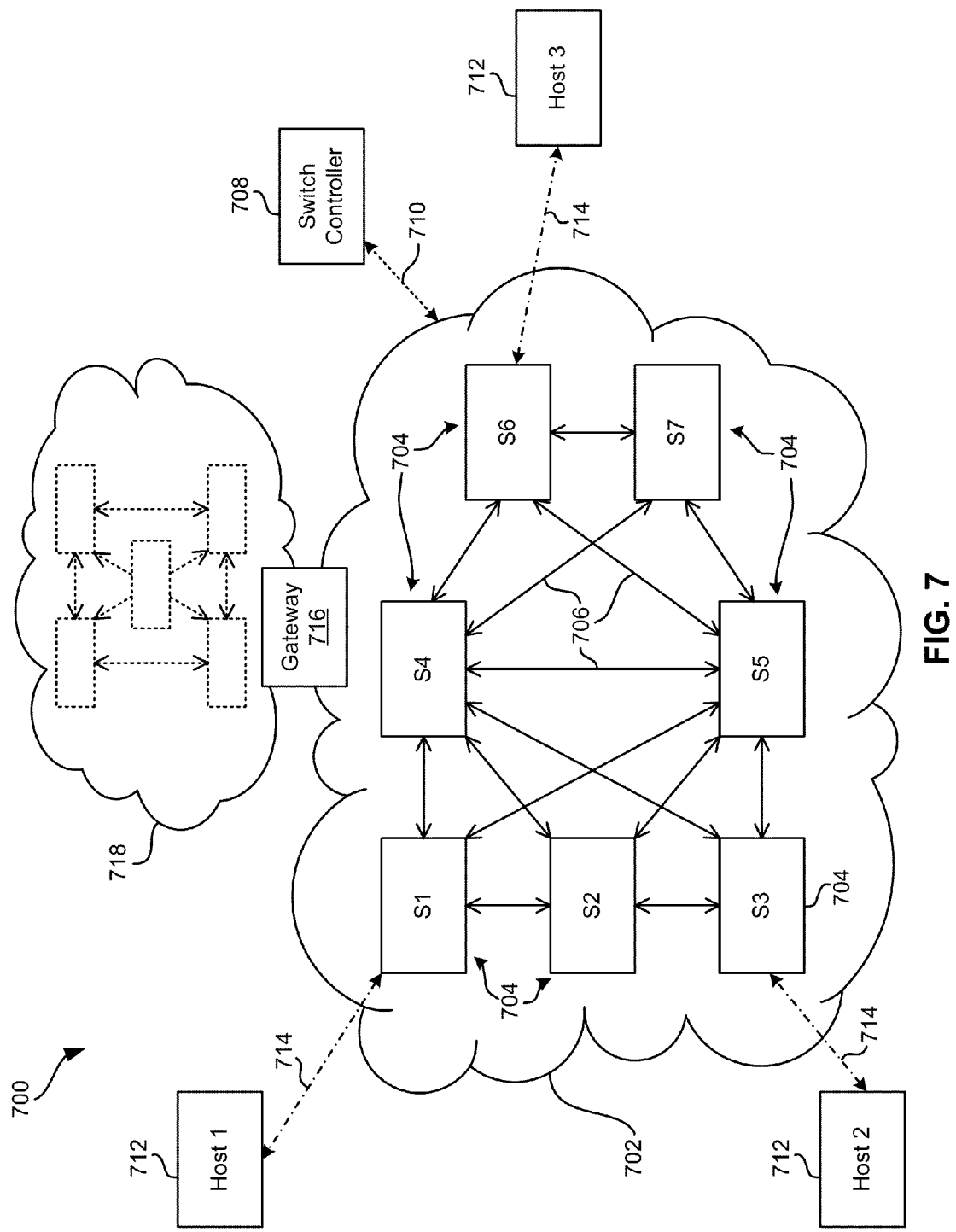
FIG. 7 shows a system using a network fabric, according to one embodiment.

Now referring to FIG. 7, a system 700 is shown according to one embodiment, which has a plurality of fabric switches 704 interconnected in a network fabric 702, each of the fabric switches 704 being connected to one another via connections 706. Each fabric switch 704 is connected, directly or indirectly to a switch controller 708 (as denoted by dashed line connection 710 between the switch controller 708 and the network fabric 702). Any of the switches described herein may be physical or virtual switches. The switch controller 708 is capable of receiving information from each of the fabric switches 704 and is capable of sending information and/or commands to the fabric switches 704. Although not shown, the network fabric 702 may also include routers and/or any other suitable hardware or virtual devices that are capable of communicating within the network fabric 702, as would be understood by one of skill in the art.

According to one embodiment, the switch controller 708 may operate according to OpenFlow and/or SDN standards, and each fabric switch 704 may be OpenFlow and/or SDN compliant. In other embodiments, the switch controller 708 may utilize any application capable of controlling the fabric switches 704 as would be known by one of skill in the art, such as Beacon, Jaxon, NOX, POX, Maestro, etc.

In addition, the network fabric 702 may be a physical and/or virtual network fabric (a network fabric which utilizes only physical devices, a network fabric which only utilizes virtual devices, and/or a network fabric which utilizes a combination of physical and virtual devices). In addition, each of the fabric switches 704 may be a physical switch, a vSwitch, or a combination thereof.

A gateway 716 may be used to bridge from the network fabric 702 to any other second network 718, whether the second network 718 is capable of communicating with the switch controller 708 or not, in one embodiment. Particularly, the second network 718 may be a conventional Ethernet network that is not a SDN. Therefore, in order for traffic to be sent to the second network 718, it must first be properly formatted to be understood by the various devices in the Ethernet network 718. Therefore, the gateway 716 may be used for this purpose. In one embodiment, the gateway 716 may be a proxy server.

The system 700 may further comprise one or more hosts 712 connected to the network fabric 702 via one or more fabric switches 704 via connections 714. Any of the hosts 712 may be a physical host, a virtual host, or a combination thereof. The hosts may be any type of device capable of communicating with the network fabric 702, such as another network, a server, a NIC, a vNIC, a controller, a workstation, an end station, etc. Each host 712 may include an interface for communicating with the network fabric 702 and one or more fabric switches 704 therein.

In accordance with one embodiment, each of the hosts 712 may be unaware of the physical components of the network fabric 702 and instead may view the network fabric 702 as a single entity to which a connection may be made. Of course, each host 712 is actually connected to at least one physical fabric switch 704 within the network fabric 702 when the host is a physical entity. The host 712 may be connected to multiple fabric switches 704 in the case of a Link Aggregation (LAG) connection.

The switch controller 708 may comprise logic adapted to analyze and configure the network fabric 702 such that there is one or more non-looping paths through the network fabric 702 between any two hosts 712 or other end stations connected to the network fabric 702. Ideally, the logic may be able to determine multiple paths through the network fabric 702, in order to provide redundancy, increased throughput, and decreased latency, among other advantages.

There are many factors to consider in determining paths through the network fabric 702. Some factors include the number of layers in the fabric, L, the number of nodes per layer, $N_L$, the switch controller's topology and connectivity graph (and whether the switch controller 708 is capable of globalizing the routing decisions), etc.

Furthermore, in order for multipathing to take place in the network fabric 702, the multipathing may take place in-order via Equal Cost Multi-Pathing (ECMP) and/or LAG hashing (and what type of hash used may be a consideration, such as an industry standard, a legacy system, etc.). In addition, the multipathing may support high performance operation via adaptive routing.

Converged Enhanced Ethernet (CEE) may also be supported by the network fabric 702, such as by using Priority Flow Control (PFC) and/or Enhanced Transmission Selection (ETS) along the complete path through the network fabric 702 in addition to Quantized Congestion Notification (QCN). Additionally, link congestion may trigger saturation tree with QCN.

In one embodiment, interface-based path representation, where a single interface to a network may be used to gain perspective on the network from a point of view of that interface. This interface-based path representation may then be used to span the network fabric 702, as shown in FIG. 7. For example, Host 1 is shown connected directly to fabric switch S1. In this example, the interface for Host 1 to the network fabric 702 may be a single physical port, a virtual port, a static LAG, a dynamic LAG, or any other suitable interface between Host 1 and fabric switch S1. Also, in this example, a global forwarding table may be created, managed, updated, and utilized by the switch controller 708 to make routing decisions, for example, once a packet is received by fabric switch S1 from Host 1 all the way until the packet is received by Host 2 via switch S3.

In one embodiment, the switch controller 708 may be consulted anytime a routing decision is to be made for a packet received by any of the fabric switches 704 in the network fabric 702.

In another embodiment, each fabric switch 704 may have resident therein a source-routing table. In this case, the fabric switch 704 inserts the route information into each incoming packet that does not yet have source-routing information stored therein. One disadvantage of this approach is that a lot of redundancy in terms of routing information in the network is introduced, which makes routing updates cumbersome, since they must be done for each fabric switch 704 in the network fabric 702. One advantage of this approach is that legacy (i.e., non-source routing capable) devices and components (e.g., contemporary NICs, legacy switches, etc.) may be attached to the network fabric 702.

A SDN, such as system 700, may have a common management framework for assignment of bandwidth to frame priorities, according to one embodiment. This SDN may be implemented as an extension to any overlay network protocol, such as Distributed Overlay Virtual Ethernet (DOVE), VXLAN, NVGRE, etc., and may be used with existing virtualization platforms from any number of vendors, such as VMWare's ESX, IBM's PowerVM, KVM, Microsoft's Hyper-V, Xen, etc. The resulting virtualization platform virtual switch (vSwitch) allows data to be organized into priority groups (also referred to as "traffic classes"), each of which is assigned a priority group identification (ID), such as a number, an alphanumeric string, etc. The priority grouping is created by and stored within a traffic manager in the server or vSwitch. Furthermore, in some approaches, the priority grouping does not require a special frame format in order to be recognized by devices which are capable of implementing traffic priority handling.

In order to allow legacy networks to coexist with this approach, a default proxy gateway 716 may be positioned between all flow credit-based network fabrics, such as network fabric 702 and any noncredit-based networks, such as network 718.

In addition, in some embodiments, a new Ethertype may be used for packets in networks using credit-based flow control which are distinguishable from other Ethertypes that may be used for packets in networks which rely on other flow control methodologies and/or standard Ethernet protocols.

In addition, in some approaches, the switch controller 708 may be aware of maximum transmission units (MTUs) for all inter-switch links (ISLs) positioned between switches 704 in the network (the ISLs are not shown for clarity). In another approach, the switch controller 708 may create a multicast path which uses only one step of segmentation and reassembly of packets occurring at either end of the link representing the multicast path. Thus, packet fragmentation is allowed under the credit-based flow control scheme described herein according to multiple embodiments.

According to one embodiment, within a SDN environment, such as system 700, the use of broadcast/multicast routing tables may be avoided by using self-routed packets that receive their routing information directly from a switch controller 708 within the system 700, and by implementing a switch-specific path identifier to create a broadcast group. Within this SDN environment, a method for credit assignment may be implemented from a switch controller 708 repository, which may implement a credit manager.

According to one embodiment, a new packet header which includes multicast destination information allows for a SDN, such as system 700, and all switches 704 and routers therein, to efficiently and effectively forward a multicast packet to all intended recipient devices within the network fabric 702. According to one embodiment, the multicast destination information may be provided by the switch controller 708. The switch controller 708 is also adapted to inform each switch 704 and router in its path of a proposed multicast pathing. The multicast pathing may be defined by the switch controller 708 or any other suitable device in the system 700. The switches 704 and routers use this information, along with information provided by the switch controller 708 to generate an appropriate mapping of the multicast packet to multiple output ports of the switch 704 and router. Each switch 704 and router receives its own specific path identifier in this computation, provided from the switch controller 708. Packets are "self-routed" through the network fabric 702 (although each switch 704 and/or router in the path determines local output port mapping for its own ports). This method of self-routing packets through the network fabric 702 avoids the need for lookup tables and unicast routing tables at each intermediate switch. Furthermore, it should reduce protocol overhead as compared to Xcast. In addition, header modification of multicast packets is not necessary, so performance improves versus methods where header modification is necessary.

Figure 8:
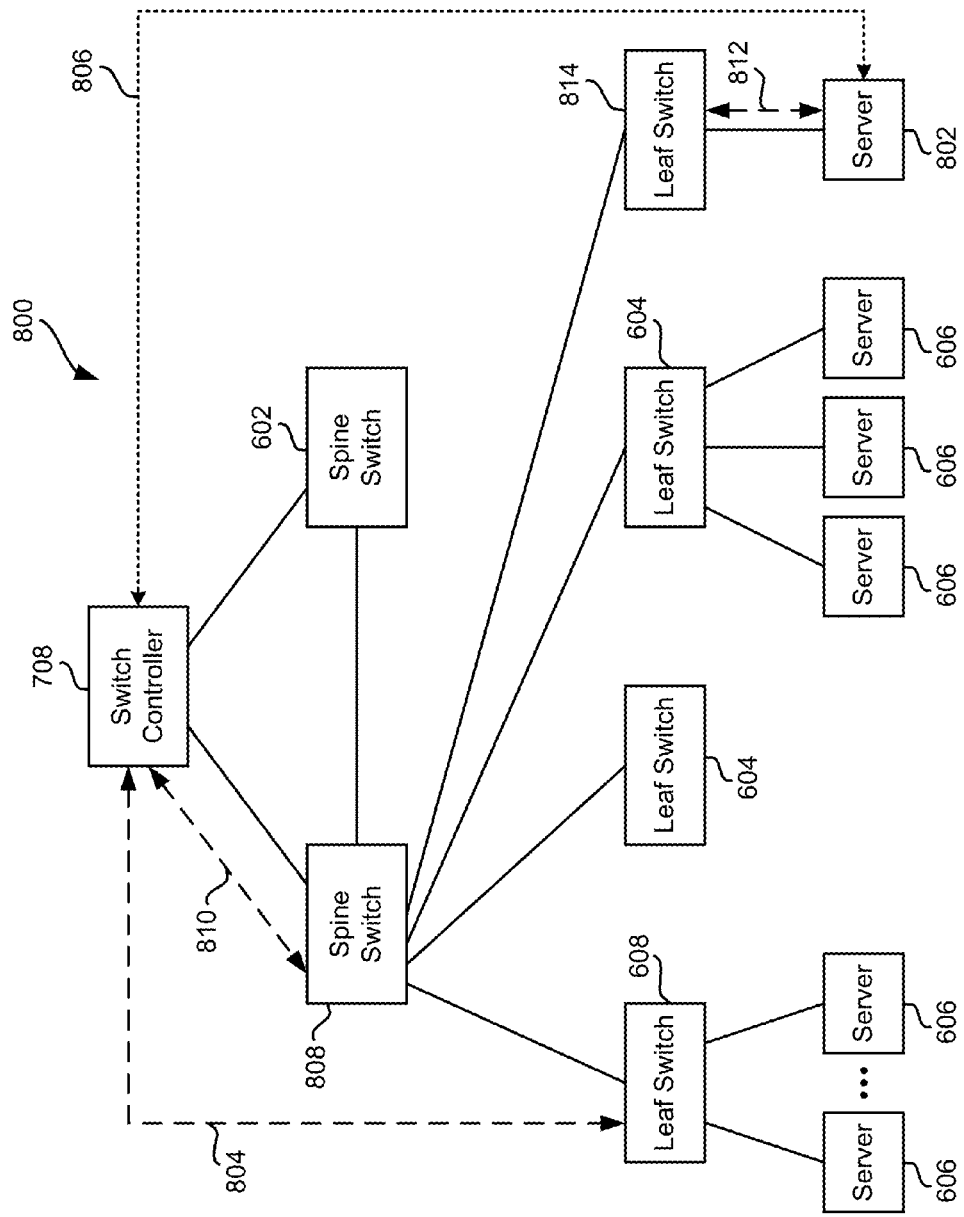
FIG. 8 shows multicast packet handling according to one embodiment.

Now referring to FIG. 8, in some embodiments, the switch controller-assigned multicast ID and switch controller-assigned switch specific path IDs may be used by the leaf switches 604 and spine switches 602 to create the output port mappings. Any of these switches may be physical or virtual, and may be Xcast-compliant in some approaches. It is assumed that the network 800 is a distributed control network (DCN) that has self-organized through a unicast routing protocol, and that the network 800 maintains this pathing in the switch controller 708 (which also has knowledge of the network topology). The path IDs may be issued in any of several ways.

In one such way, the physical topology discovered related to an SDN-enabled DCN and the path ID assignments may be provided from a switch controller 708 via link layer discovery protocol (LLDP), or with any other suitable dynamic routing protocol, such as border gateway protocol (BGP), open shortest path first (OSPF), spanning tree, etc.

Path ID management is centralized at the switch controller 708, such as in a manner similar to how dynamic host configuration protocol (DHCP) services collect requests. In addition, path ID generation and path ID assignment to relevant switches 608 is also centralized at the switch controller 708. When a server 606 sends a request to join a multicast data stream of interest (known as source-based multicast), a leaf switch 608 which first receives the server's request may forward the join request 804 to the switch controller 708. A join request 804 may be generated by each server 606 which desires to join the multicast data stream of interest.

The switch controller 708, in response to the join request 804, refers to a local network topology database, which may be created through path discovery when the network is set up, and creates a multipath ID and stores it in memory of the switch controller 708. The switch controller 708 also creates a series of path IDs for each intermediate switch in the multicast path. These path IDs are associated with the desired output port bitmaps on the leaf switch 608. This information is sent down to a device which is a source of multicast traffic for the multicast data stream to which the leaf switch 608 desired to join. The path ID for the leaf switch 608 that forwarded on the join request 804 for the multicast data stream and the multipath ID in a packet sent out by the source of the multicast data stream may be used to determine an output port mapping for that leaf switch 608.

In addition, a spine switch 808 may also forward a join request 810 to join the multicast data stream of interest to the switch controller 708, which in response calculates and sends down a multipath ID and a series of path IDs to related to the spine switch 808 to a source of the multipath data stream.

In an alternate embodiment, the join requests 812 may be collected at a server 802, or the server 802 may create the join request directly. The server shown (server 802) is exemplary only and any other suitable server at any other suitable location in the network 800 may be used to collect join requests 812. These join requests 812 may be sent to the switch controller 708 via connection 806 for handling. The switch controller 708, in response to the join request 812, refers to a local network topology database, creates a multipath ID and stores it in memory of the switch controller 708. The switch controller 708 also creates a series of path IDs for each intermediate switch in the multicast path, and sends this information to a source of the multicast data stream to which the join request was intended to join. In this way, the source of the multicast data stream now has information necessary to send unicast packets directly to recipients of the multicast data stream, rather than multicasting to all devices in the network 800.

The multipath ID is attached to headers of unicast packets, and the unicast packets are forwarded to the next switch in the network 800 when the source of the multicast data stream sends out data for that stream. The unicast packet may also include a multicast group address appended to an end of the multipath ID. This allows for any device which receives the unicast packet to convert the unicast packet into a multicast packet using the multicast group address before sending the multicast packet to any device which is not capable of interpreting the multipath ID in the header of the unicast packet.

A switch which receives the unicast packet determines an output port mapping based on the multipath ID and the path ID. The switch duplicates the unicast packet (if needed to forward to multiple destinations) and forwards the unicast packet to an appropriate output port(s) according to the output port mapping. A next hop switch performs the same functionality when receiving the unicast packet from a previous switch in the multipath, until eventually all the duplicated unicast packets reach their destinations throughout the multipath.

Internet group management protocol (IGMP) snooping may be enabled on leaf switches 604 and spine switches 602, as the facility that allows for joining and leaving multicast groups, in one embodiment. Furthermore, the various join requests 804, 810, 812 may be IGMP join requests, in a further embodiment.

According to another embodiment, the join requests may adhere to multicast listener discovery (MLD), and the switch controller 708 may be capable of using this protocol to discover other devices in the network 800.

Of course, any suitable protocol may be used for discovering devices, as known in the art including, but not limited to, IGMP v3 as specified in request for comments (RFC) 3376, IGMP v2 as specified in RFC 2236, IGMP v1 as specified in RFC 1112, MLD v2 as specified in RFC 3810, MLD v1 as specified in RFC 2710, IGMP source specific multicast (SSM) support as specified in RFC 4604, IGMP/MLD Proxy as specified in RFC 4605, etc.

In one embodiment, an access control list (ACL) may be used to capture multicast packets and send these packets to the processor. A new ACL rule may be used which performs the same functionality as described above in regard to modifying the packet for the multipath routing, thereby allowing for an ACL to be used in place of IGMP snooping.

Figure 9:
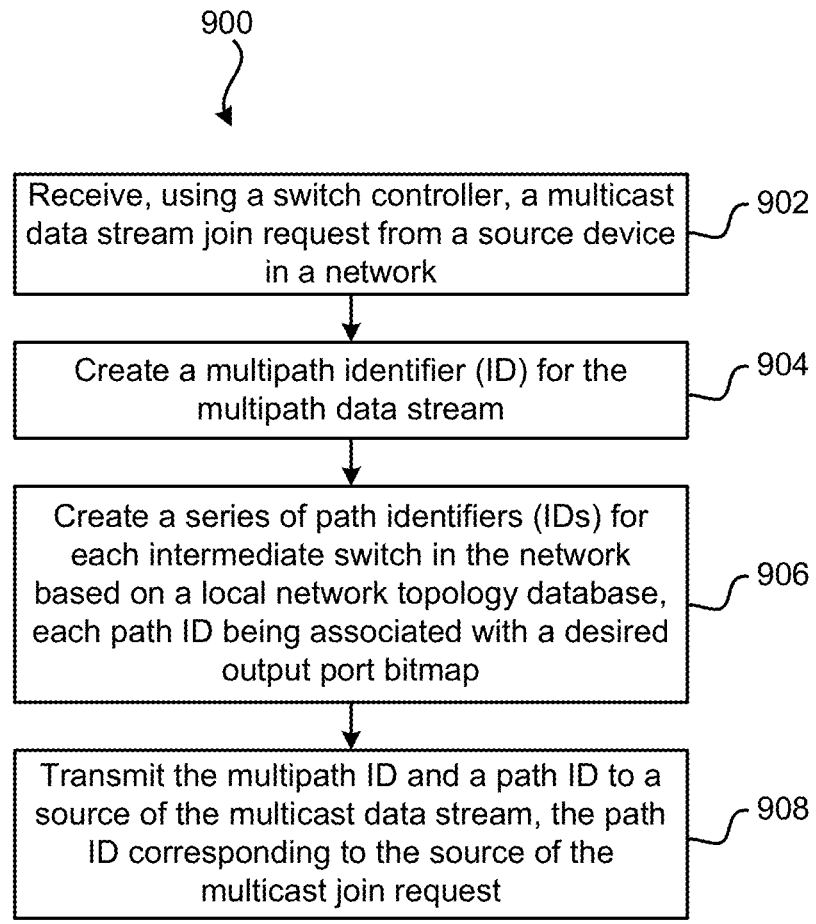
FIG. 9 shows a flowchart of a method according to one embodiment.

Now referring to FIG. 9, a method 900 for providing self-routing multicast is described, according to one embodiment. In addition, method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in one embodiment, the method 900 may be partially or entirely performed by a switch, a router, a vSwitch hosted by a server, a server, a switch controller (such as a SDN controller, OpenFlow controller, etc.), a credit manager, a traffic controller, a processor (such as a CPU, an ASIC, an FPGA, etc.), a NIC, a vNIC, a virtualization platform, or any other suitable device or component of a network system or fabric.

As shown in FIG. 9, method 900 may initiate with operation 902, where a multicast data stream join request is received, using a switch controller, from a source device in a network. In one embodiment, the network may be a SDN, and the switch controller may be a SDN controller, which may operate according to OpenFlow or any other suitable protocol or standard.

In operation 904, a multipath ID is created for the multipath data stream. This operation may be performed by the switch controller or any other suitable component of the network.

In operation 906, a series of path IDs for each intermediate switch in the network are created based on a local network topology database. Path discovery may be performed on the network for the multicast data stream. This operation may be performed by the switch controller or any other suitable component of the network in order to create the network topology database.

Each path ID is associated with a desired output port bitmap to be used by one of the intermediate switches in the network. End switches need not have this type of information created for them because they will only be the endpoint of any packets transmitted thereto.

In operation 908, the multipath ID and a path ID are transmitted to a source of the multicast data stream. The path ID corresponds to the source of the multicast join request, and provides forwarding information for that particular device.

In one embodiment, the multicast join request is an IGMP join request, and IGMP snooping may be enabled on the source of the multicast join request.

In another embodiment, the method 900 may further comprise receiving the multipath ID and path ID from the switch controller, creating a unicast packet having the multipath ID in a header of the packet, the header further comprising a multicast group address appended to an end of the multipath ID, and determining at least one output port with which to forward the unicast packet, the output port corresponding to the source of the multicast join request. Any or all of these operations may be performed by the source of the multicast data stream, which has received the information from the switch controller.

In another further embodiment, the source of the multicast data stream may be a virtual or physical switch, and the at least one output port may be determined based on the multipath ID and the path ID which corresponds to an output port mapping for that virtual or physical switch. Furthermore, the method 900 may also include duplicating the unicast packet when the output port mapping indicates that multiple output ports are used to forward the unicast packet and forwarding the one or more unicast packets according to the output port mapping. These operations may be performed by the virtual or physical switch, in some approaches.

In a further embodiment, the unicast packet may be converted into a multicast packet using the multicast group address before sending the multicast packet to any device which is not capable of interpreting the multipath ID in the header of the unicast packet.

According to another approach, the source of the multicast data stream may be a server, and the method 900 may include sending the unicast packet to a first switch in the multipath as indicated by the output port mapping, such as by using the server.

Figure 10:
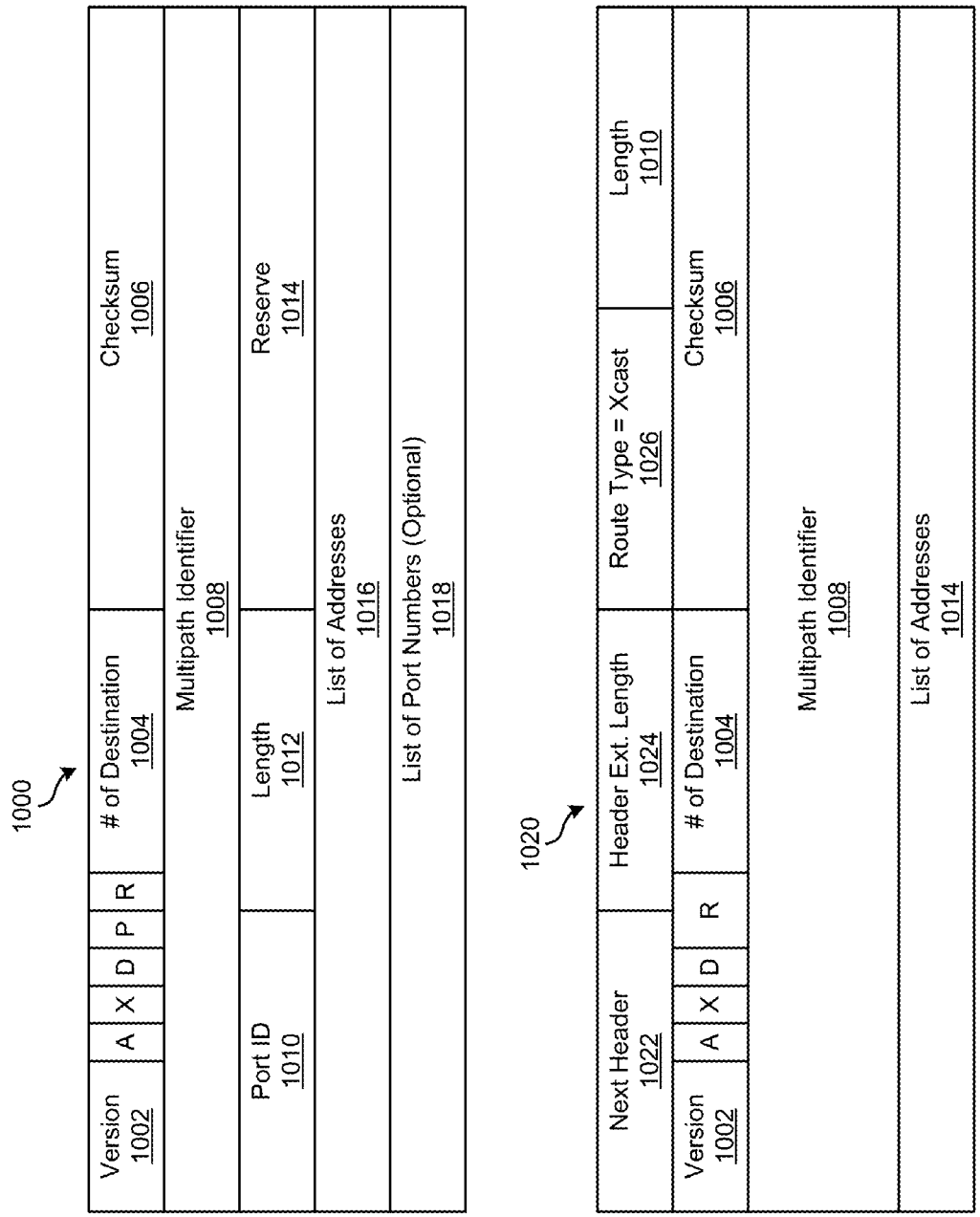
FIG. 10 shows exemplary frame formats, according to one embodiment.

Now referring to FIG. 10, an exemplary frame format 1000 for IPv4 multicast packets and an exemplary frame format 1020 for IPv6 multicast packets are shown according to various embodiments. The IPv4 frame format 1000 may be used in conjunction with an [IPv4 header/Xcast4/transport header/payload] formatted packet. The IPv6 frame format 1020 may be used in conjunction with an [IPv6 header/Xcast6/transport header/payload] formatted packet.

The number (#) of destination field 1004 is incremented by one and entry of an original multicast IP address is added at the end of the list of addresses field 1014 for each hop. In this embodiment, no DSCP bits are lost.

The multipath ID field 1008 includes a multipath ID provided by the switch controller. The multipath ID field 1008 may be any length necessary to be used to store a plurality of path IDs.

Switches where the actual multicast receiver is attached copy the multicast address from the list of addresses field 1016 and writes it as the destination address before sending to the packet to the multicast receiver. In addition, intermediate switches replicate relevant members of the list of addresses field 1016 based on the port to which the packet is being forwarded. This reduces the packet size as it travels away from the source of the packet.

The version field 1002 may be used to enhance the frame format in the future or as desired by a user, such as to support more granularity by including the ability to add additional priorities and/or port IDs. The checksum field 1006, length field 1012, reserve field 1014, next header field 1022, header extension length field 1024, and route type field 1026 may be used according to customary usage of such fields.

The port ID field 1010 may be used to denote a port ID for egress of the packet. The port ID field 1010 may be any length necessary to be used to store a plurality of IDs.

The reserve field 1014 may be used for any purpose as desired by a tenant and/or user, or may be configured to store particular information. In one embodiment, the reserved field 1014 may be any length as desired and/or as needed. The checksum field 1006 may be used to ensure integrity of the frame, as would be understood by one of skill in the art.

The exemplary frame formats described above may be used in relation to any embodiments described herein. In addition, a system and/or a computer program product may be used with the exemplary frame formats.

In one embodiment, a system includes a switch controller comprising a hardware processor and logic integrated with and/or executable by the processor, the logic being adapted to receive a multicast data stream join request from a source device in a network, create a multipath ID for the multipath data stream, create a series of path IDs for each intermediate switch in the network based on a local network topology database, each path ID being associated with a desired output port bitmap, and transmit the multipath ID and a path ID to a source of the multicast data stream, the path ID corresponding to the source of the multicast join request.

In a further embodiment, the source of the multicast data stream may comprise logic adapted to receive the multipath ID and path ID from the switch controller, create a unicast packet having the multipath ID in a header of the packet, the header further comprising a multicast group address appended to an end of the multipath ID, and determine at least one output port with which to forward the packet, the output port corresponding to the source of the multicast join request.

In another embodiment, the source of the multicast data stream may be a virtual or physical switch, and the at least one output port may be determined based on the multipath ID and the path ID which corresponds to an output port mapping. Furthermore, the virtual or physical switch may include logic adapted to duplicate the unicast packet when the output port mapping indicates that multiple output ports are used to forward the unicast packet, and forward the one or more unicast packets according to the output port mapping.

In another embodiment, the source of the multicast data stream may be a server, the server comprising logic adapted to send the unicast packet to a first switch in the multipath as indicated by the output port mapping.

In addition, a recipient of the unicast packet may comprise logic adapted to convert the unicast packet into a multicast packet using the multicast group address before sending the multicast packet to any device which is not capable of interpreting the multipath ID in the header of the unicast packet.

In another embodiment, a computer program product for providing self-routing multicast comprises a computer readable storage medium having program code embodied therewith, the program code readable/executable by a processor to: receive, using the processor, a multicast data stream join request from a source device in a network; create, using the processor, a multipath ID for the multipath data stream; create, using the processor, a series of path IDs for each intermediate switch in the network based on a local network topology database, each path ID being associated with a desired output port bitmap; and transmit, using the processor, the multipath ID and a path ID to a source of the multicast data stream, the path ID corresponding to the source of the multicast join request.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a switch controller comprising a hardware processor and logic integrated with and/or executable by the processor, the logic being configured to:
   receive a multicast data stream join request from a source device in a network, wherein the multicast join request is an internet group management protocol (IGMP) join request;
   create a multipath identifier (ID) for the multipath data stream;
   create a series of path identifiers (IDs) for each intermediate switch in the network based on a local network topology database, each path ID being associated with a desired output port bitmap; and
   transmit the multipath ID and a path ID to a source of the multicast data stream, the path ID corresponding to the source of the multicast join request,
   wherein broadcast and/or multicast routing tables are not used by the intermediate switches due to implementation of the path IDs specific to each intermediate switch to create a broadcast group.

2. The system as recited in claim 1, wherein IGMP snooping is enabled on the source of the multicast join request, and wherein the logic is further configured to collect and store maximum transmission units (MTUs) for any inter-switch links (ISLs) positioned between the intermediate switches in the network.

3. The system as recited in claim 1, wherein the source of the multicast data stream and the source of the multicast join request are explicit multicast (Xcast)-compliant.

4. The system as recited in claim 1, wherein the source of the multicast data stream comprises logic configured to:
receive the multipath ID and path ID from the switch controller;
create a unicast packet having the multipath ID in a header of the unicast packet, wherein the header further comprises a multicast group address appended to an end of the multipath ID; and
determine at least one output port with which to forward the unicast packet, the output port corresponding to the source of the multicast join request.

5. The system as recited in claim 4, wherein the source of the multicast data stream is a virtual or physical switch, and wherein the at least one output port is determined based on the multipath ID and the path ID which corresponds to an output port mapping.

6. The system as recited in claim 5, wherein the virtual or physical switch further comprising logic configured to:
duplicate the unicast packet when the output port mapping indicates that multiple output ports are used to forward the unicast packet; and
forward the one or more unicast packets according to the output port mapping.

7. The system as recited in claim 4, wherein the source of the multicast data stream is a server, the server comprising logic configured to send the unicast packet to a first switch in the multipath as indicated by the output port mapping.

8. The system as recited in claim 4, wherein a recipient of the unicast packet comprises logic configured to convert the unicast packet into a multicast packet using the multicast group address before sending the multicast packet to any device which is not capable of interpreting the multipath ID in the header of the unicast packet.

9. A computer program product for providing self-routing multicast, the computer program product comprising a computer readable storage medium having program code embodied therewith, the program code readable/executable by a processor to:
receive, using the processor, a multicast data stream join request from a source device in a network;
create, using the processor, a multipath identifier (ID) for the multipath data stream;
create, using the processor, a series of path identifiers (IDs) for each intermediate switch in the network based on a local network topology database, each path ID being associated with a desired output port bitmap; and
transmit, using the processor, the multipath ID and a path ID to a source of the multicast data stream, the path ID corresponding to the source of the multicast join request.

10. The computer program product as recited in claim 9, wherein the multicast join request is an internet group management protocol (IGMP) join request, and wherein IGMP snooping is enabled on the source of the multicast join request.

11. The computer program product as recited in claim 9, wherein the source of the multicast data stream and the source of the multicast join request are explicit multicast (Xcast)-compliant.

12. The computer program product as recited in claim 9, wherein the program code readable/executable by the processor is further configured to:
receive the multipath ID and path ID;
create a unicast packet having the multipath ID in a header of the unicast packet, wherein the header further comprises a multicast group address appended to an end of the multipath ID; and
determine at least one output port with which to forward the unicast packet, the output port corresponding to the source of the multicast join request.

13. The computer program product as recited in claim 12, wherein the source of the multicast data stream is a virtual or physical switch, and wherein the at least one output port is determined based on the multipath ID and the path ID which corresponds to an output port mapping.

14. The computer program product as recited in claim 13, wherein the program code readable/executable by the processor is further configured to:
duplicate the unicast packet when the output port mapping indicates that multiple output ports are used to forward the unicast packet; and
forward the one or more unicast packets according to the output port mapping.

15. The computer program product as recited in claim 12, wherein the source of the multicast data stream is a server, and wherein the program code readable/executable by the processor is further configured to send the unicast packet to a first switch in the multipath as indicated by the output port mapping.

16. The computer program product as recited in claim 9, wherein the network is a software-defined network (SDN), and wherein broadcast and/or multicast routing tables are not used by the intermediate switches in the network due to implementation of the path IDs specific to each intermediate switch to create a broadcast group.

17. A method for providing self-routing multicast, the method comprising:
receiving, using a switch controller, a multicast data stream join request from a source device in a network;
creating a multipath identifier (ID) for the multipath data stream;
creating a series of path identifiers (IDs) for each intermediate switch in the network based on a local network topology database, each path ID being associated with a desired output port bitmap; and
transmitting the multipath ID and a path ID to a source of the multicast data stream, the path ID corresponding to the source of the multicast join request.

18. The method as recited in claim 17, further comprising:
receiving, using the source of the multicast data stream, the multipath ID and path ID from the switch controller;
creating, using the source of the multicast data stream, a unicast packet having the multipath ID in a header of the packet, wherein the header further comprises a multicast group address appended to an end of the multipath ID; and
determining, using the source of the multicast data stream, at least one output port with which to forward the packet, the output port corresponding to the source of the multicast join request,
wherein broadcast and/or multicast routing tables are not used by the intermediate switches in the network due to implementation of the path IDs specific to each intermediate switch to create a broadcast group.

19. The method as recited in claim 18, wherein the source of the multicast data stream is a virtual or physical switch, and wherein the at least one output port is determined based on the multipath ID and the path ID which corresponds to an output port mapping, and further comprising:

duplicating, using the virtual or physical switch, the unicast packet using the switch when the output port mapping indicates that multiple output ports are used to forward the unicast packet; and forwarding, using the virtual or physical switch, the one or more unicast packets according to the output port mapping.

20. The method as recited in claim 18, further comprising converting the unicast packet into a multicast packet using the multicast group address before sending the multicast packet to any device which is not capable of interpreting the multipath ID in the header of the unicast packet.

* * * * *